United States Patent

Speziale et al.

[15] 3,665,023
[45] May 23, 1972

[54] N-(4-NITROPHENYLSULFONYL)-N'-(CHLORO AND/OR NITRO SUBSTITUTED BENZOYL)UREAS

[72] Inventors: Angelo Speziale, Creve Coeur; Lowell R. Smith, Chesterfield, both of Mo.

[73] Assignee: Monsanto Company, St. Louis, Mo.

[22] Filed: Mar. 27, 1970

[21] Appl. No.: 29,722

Related U.S. Application Data

[62] Division of Ser. No. 737,344, June 17, 1968, Pat. No. 3,547,618.

[52] U.S. Cl. .................................................260/397.7 D
[51] Int. Cl. .................................................C07c 143/78

[58] Field of Search .........................260/397.7, 397.7 D

[56] References Cited

UNITED STATES PATENTS 3,519,415   7/1970   Smith et al. ..................260/397.7 X

*Primary Examiner*—Leon Zitver
*Assistant Examiner*—Gerald A. Schwartz
*Attorney*—Neal E. Willis, John J. Henschke, Jr. and Albert J. Greene

[57] ABSTRACT

Compounds of the class N-(4-nitrophenylsulfonyl)-N'-(chloro and/or nitro substituted benzoyl) ureas which compounds are phytocidally active.

4 Claims, No Drawings

N-(4-NITROPHENYLSULFONYL)-N'-(CHLORO AND/OR NITRO SUBSTITUTED BENZOYL)UREAS

This application is a division of copending application Ser. No. 737,344 filed June 17, 1968, now U.S. Pat. No. 3,547,618.

This invention relates to new and useful compounds, that is N-(4-nitrophenylsulfonyl)-N'-(chloro and/or nitro substituted benzoyl) ureas of the general formula

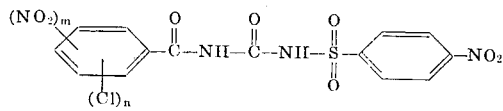

wherein $m$ is a whole number from 0 to 1, inclusive, wherein $n$ is a whole number from 0 to 3, inclusive, but wherein at least one of $m$ and $n$ is 1, and but wherein the sum total of $m$ and $n$ is a whole number from 1 to 3, inclusive.

These compounds are readily prepared by bringing together and reacting substantially equimolecular proportions of a chloro and/or nitro substituted benzoyl isocyanate of the formula

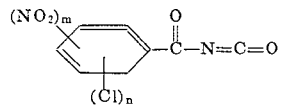

wherein $m$ and $n$, respectively, have the aforedescribed significance, and 4-nitrophenylsulfonamide

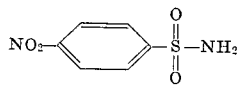

in the presence of suitable inert organic liquid, such as benzene, toluene, xylene, hexane, octane, nonane, etc. and mixtures thereof. The reaction temperature employed is preferably in the range of from about 70° C up to the boiling point of the system at atmospheric pressure in a dry atmosphere.

As illustrative of the preparation of the compounds of this invention but not limitative thereof is the following:

EXAMPLE I

To a suitable reaction vessel equipped with a thermometer, agitator and reflux condenser is charged approximately 0.025 moles of N-(3,4-dichlorobenzoyl)isocyanate, approximately 0.025 moles of 4-nitro-phenylsulfonamide, and approximately 55 parts by weight of toluene. While agitating the so charged mass, it is heated up to its boiling point and then refluxed for about 25 hours. The mass is then cooled to about room temperature and filtered. The filter cake is dried and then the dried cake is recrystallized from acetone, yielding N-(4-nitrophenylsulfonyl)-N'-(3,4-dichlorobenzoyl) urea, a high melting solid.

EXAMPLE II

Employing the procedure of Example I but replacing N-(3,4-dichlorobenzoyl) isocyanate with an equimolecular amount of N-(4-chlorobenzoyl) isocyanate there is obtained N-(4-nitrophenylsulfonyl)-N'-(4-chlorobenzoyl) urea, a high melting solid.

EXAMPLE III

Employing the procedure of Example I but replacing N-(3,4-dichlorobenzoyl) isocyanate with an equimolecular amount of N-(2-nitrobenzoyl) isocyanate there is obtained N-(4-nitrophenylsulfonyl)-N'-(2-nitrobenzoyl) urea.

Other substituted ureas of this invention obtained from the appropriate chloro and/or nitro substituted benzoyl isocyanate and 4-nitrophenylsulfonamide in accordance with the procedure of Example I include:

N-(4-nitrophenylsulfonyl)-N'-(2,4,5-trichlorobenzoyl)urea
N-(4-nitrophenylsulfonyl)-N'-(2,4,6-trichlorobenzoyl)urea
N-(4-nitrophenylsulfonyl)-N'-(3,5-dichlorobenzoyl)urea
N-(4-nitrophenylsulfonyl)-N'-(3-chlorobenzoyl)urea
N-(4-nitrophenylsulfonyl)-N'-(4-nitrobenzoyl)urea
N-(4-nitrophenylsulfonyl)-N'-(3-nitrobenzoyl)urea
N-(4-nitrophenylsulfonyl)-N'-(2-chloro-4-nitrobenzoyl) urea, and the like.

The methods by which the aforedescribed compounds of this invention are isolated will vary slightly with the reactants employed and the product produced. Further purification by selective solvent extraction or by absorptive agents such as activated carbon or clays can precede the removal of the inert organic liquid (or solvent) when the latter is employed. Additionally an inert organic solvent can be added to and in the purification by absorptive agents. However, in that the products are phytocidally active they are generally satisfactory for phytocidal purposes without further purification.

The compounds of this invention are useful in inhibiting the growth of noxious grasses (i.e., narrow leaf plants) such as wild oat, brome grass, rye grass, foxtail, crab grass, and the like, and noxious broad leaf plants, such as pigweed and the like prior to their respective emergence from soil or other growth media by treating said soil or other growth media at a rate of about 10 pounds per acre or other higher or lower effective growth inhibiting amounts thereof. Valuable pre-emergent phytocidal effects will be observed by applications of small amounts, for example, as low as 0.1 lbs. of active component per acre as well as higher concentrations, for example, 30 lbs. per acre. The preferred range of application for pre-emergent phytocidal purposes is from about 1 to about 15 lbs. per acre.

The compounds of this invention are also useful as phytocides at a rate of about 10 pounds per acre against a wide variety of plant life in the growing or post-emergent state, particularly noxious grasses such as wild oat, brome grass, rye grass, foxtail, crab grass, and the like, and noxious broad leaf plants such as pigweed. Valuable post-emergent phytocidal effects will be observed by applications of small amounts, for example, as low as 0.1 lbs. of active component per acre as well as higher concentrations, for example, 30 lbs. per acre. The preferred range of application for post-emergent phytocidal purposes is from about 1 to about 15 lbs. per acre.

It will be apparent that different effects can be obtained by modifying the method of use. For this reason an essential part of this invention is the formulation thereof so as to permit a uniform predetermined application of the new phytocides to growing plants or soil or other growth media so as to produce the desired effect. By proper selection and proportioning of the various conditioning agents either liquid or solid formulations can be prepared, and so as to adapt the new phytocide for achieving the desired result with any conventional device for treating growing plants or the surface or sub-surface of the soil or other growth media.

Although the compounds of this invention are useful per se in controlling a wide variety of plant growth in the pre-emergent or post-emergent state, it is preferable that they be supplied to the plant growing medium or growing plant in a dispersed form in a suitable extending agent.

In the instant specification and appended claims it is to be understood that the term "dispersed" is used in its widest possible sense. When it is said that the compounds of this invention are dispersed, it means that the particles thereof can be molecular in size and held in true solution in a suitable organic solvent. It means further that the particles can be colloidal in size and distributed throughout a liquid phase in the form of suspensions or emulsions or in the form of particles held in suspension by wetting agent. The term "dispersed" also means that the particles can be mixed with and distributed throughout a solid carrier providing a mixture in particulate form e.g., pellets, granules, powders, or dusts.

The exact concentration of the compounds of this invention employed in combatting or controlling noxious vegetation can vary considerably provided the required dosage (i.e., phytotoxic amount) thereof is supplied to the growing plant or plant growing medium. From a practical point of view, the manufacturer must supply the agriculturist with a low-cost concentrate or spray base or particulate solid base in such form that, by merely mixing with water or solid extender (e.g., powdered clay or talc) or other low-cost material available to the agriculturist at the point of use, he will have an easily prepared phytocidal spray or particulate solid. In such a concentrate composition, a compound of this invention generally will be present in a concentration of 5 to 95 percent by weight, the residue being any one or more of the well-known phytocidal adjuvants, such as the various surface active agents (e.g., detergents, a soap or other emulsifying or wetting agent), surface active clays, solvents, diluents, carrier media, adhesives, spreading agents, humectants, and the like.

There are a large number of organic liquids which can be used for the preparation of solutions, suspensions or emulsions of the compounds of this invention. For example, isopropyl ether, acetone, methyl ethyl ketone, dioxane, cyclohexanone, carbon tetrachloride, ethylene dichloride, tetrachloroethane, hexane, heptane and like higher liquid alkanes, hydrogenated naphthalenes, solvent naphtha, benzene, toluene, xylene, petroleum fractions (e.g., those boiling almost entirely under 400° F. and having a flash point above about 80° F., particularly kerosene), mineral oils and the like.

The compounds of this invention are preferably applied to growing plants or the plant growing medium in the form of emulsions or suspensions. Emulsions or suspensions are prepared by dispersing a compound of this invention either per se or in the form of an organic solution thereof in water with the aid of a water-soluble surfactant. The term "surfactant" as employed here in the appended claims is used as in Volume II of Schwartz, Perry and Berch's "Surface Active Agents and Detergents" (1958, Interscience Publishers, Inc., New York) in place of the expression "emulsifying agent," to connote generically the various "emulsifying agents," "dispersing agents," "wetting agents" and "spreading agents" that are adapted to be admixed with the active compounds of this invention in order to secure better wetting and spreading of the new phytocidal ingredient in the water vehicle or carrier in which it is insoluble through lowering the surface tension of the water (see also Frear "Chemistry of Insecticides, Fungicides and Herbicides," second edition, 1948, page 280). These surfactants include the well-known capillary active substances which may be anion-active (or anionic), or, and preferably, non-ionizing (or non-ionic) which are described in detail in Volume I and II of Schwartz, Perry and Berch's "Surface Active Agents and Detergents," (1958, Interscience Publishers, Inc., New York) and also in the November 1947 issue of Chemical Industries (pages 811–824) in an article entitled "Synthetic Detergents" by John W. McCutcheon and also in the July, August, September, and October, 1952 issues of Soap and Sanitary Chemicals under the title "Synthetic Detergents." The disclosures of these articles with respect to surfactants, i.e. the anion-active and non-ionizing capillary active substances are incorporated in this specification by reference in order to avoid unnecessary enlargement of this specification. The preferred surfactants are the water-soluble non-ionic surface-active agents set forth in U.S. Pat. No. 2,846,398 (issued Aug. 4, 1958).

The compounds of this invention can be dispersed by suitable methods (e.g., tumbling or grinding) in solid extending agents either of organic or inorganic nature and applied to growing plants or plant growing medium in particulate form. Such solid materials include for example, tricalcium phosphate, calcium carbonate, kaoline, bole, kieselghur, talc, bentonite, fuller's earth, pyrophillite, diatomaceous earth, calcined magnesia, volcanic ash, sulfur and the like inorganic solid materials and include for example, such materials of organic nature as powdered cork, powdered wood, and powdered walnut shells. The preferred solid carriers are the adsorbent clays, e.g., attapulgus clay. These mixtures can be used for phytocidal purposes in the dry form or by addition of water-soluble surfactants or wetting agents the dry particulate solids can be rendered wettable by water so as to obtain stable aqueous dispersions or suspensions suitable for use as sprays.

In all of the forms described above the dispersions can be provided ready for use in combatting noxious vegetation or they can be provided in a concentrated form suitable for mixing with or dispersing in other extending agents. As illustrative of a particularly useful concentrate is an intimate mixture of the compound of this invention with a water-soluble non-ionic surfactant which lowers the surface tension of water in the weight proportions of 0.1 to 15 parts of surfactant with sufficient of a compound of this invention to make 100 parts by weight. Such a concentrate is particularly adapted to be made into a spray for combatting various forms of noxious vegetation by the addition of water thereto. As illustrative of such a concentrate is an intimate mixture of 95 parts by weight of N-(4-nitrophenylsulfonyl)-N'-(3,4-dichlorobenzoyl) urea and 5 parts by weight of a water-soluble non-ionic surfactant such as polyoxyethylene derivative of sorbitan monolaurate.

Another useful concentrate adapted to be made into a spray for combatting noxious vegetation is a solution (preferably as concentrated as possible) of a compound of this invention in an organic solvent therefor. The said liquid concentrate preferably contains dissolved therein a minor amount (e.g., 0.5 to 10 percent by weight of the weight of the new phytocidal agent) of a surfactant (or emulsifying agent), which surfactant is water-soluble. As illustrative of such a concentrate is a solution of N-(4-nitrophenylsulfonyl)-N'-(3,4-dichlorobenzoyl) urea in acetone which solution contains dissolved therein a water-soluble non-ionic surfactant.

Of the surfactants aforementioned in preparing the various emulsifiable, wettable or dispersible compositions or concentrates of this invention, the non-ionic surfactants are preferred. Of the non-ionic surfactants the particularly preferred are the water-soluble polyoxyethylene derivatives of alkylphenols (particularly isooctylphenol) and the water-soluble polyoxyethylene derivatives of the mono-higher fatty acid esters of sorbitan respectively containing 15 to 30 moles of ethylene oxide per mole of sorbitan mono-ester or alkylphenol.

The compounds of this invention can also be advantageously employed in combination with other pesticides, including, for example, fungicides, nematocides, bactericides, and insecticides. In this manner it is possible to obtain mixtures which are effective against a wide variety of pests and other forms of noxious life.

While this invention has been described with respect to certain embodiments, it is to be understood that it is not so limited and that variations and modifications thereof obvious to those skilled in the art can be made without departing from the spirit and scope thereof.

What is claimed is:

1. An N-(4-nitrophenylsulfonyl)-N'-(substituted benzoyl) urea of the general formula

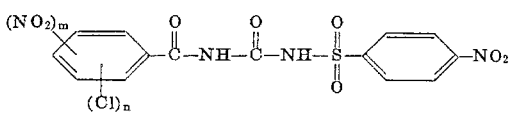

wherein $m$ is a whole number from 0 to 1 inclusive, wherein $n$ is a whole number from 0 to 3, inclusive, but wherein at least one of $m$ and $n$ is 1, and but wherein the sum total of $m$ and $n$ is a whole number from 1 to 3, inclusive.

2. A substituted urea of claim 1 wherein $n$ is 3, and wherein $m$ is zero.

3. A substituted urea of claim 1 wherein $m$ is zero, wherein $n$ is 2, the two chloro substituents being in the 3 and 4 positions, respectively.

4. A substituted urea of claim 1 wherein $m$ is zero, wherein $n$ is 1, the chloro substituent being in the 4-position.

* * * * *